United States Patent
Yukie et al.

(10) Patent No.: US 7,363,062 B2
(45) Date of Patent: Apr. 22, 2008

(54) ENHANCED MOBILITY WIRELESS LOCAL LOOP PHONE

(75) Inventors: Satoru Yukie, San Diego, CA (US); Mike Kwon, San Diego, CA (US); Duk San Kim, San Diego, CA (US); Craig M. Hagopian, San Diego, CA (US)

(73) Assignee: Axesstel, Inc., San Diego, CA (US)

( * ) Notice: Subject to any disclaimer, the term of this patent is extended or adjusted under 35 U.S.C. 154(b) by 0 days.

(21) Appl. No.: 11/530,214

(22) Filed: Sep. 8, 2006

(65) Prior Publication Data

US 2007/0004401 A1 Jan. 4, 2007

Related U.S. Application Data

(63) Continuation of application No. 10/660,080, filed on Sep. 10, 2003, now Pat. No. 7,117,007.

(60) Provisional application No. 60/409,719, filed on Sep. 10, 2002.

(51) Int. Cl.
*H04M 1/00* (2006.01)
(52) U.S. Cl. .................. 455/572; 455/550.1; 455/573; 455/574; 455/554.2; 455/556.1; 455/557; 455/343.6
(58) Field of Classification Search ............. 455/414.1, 455/426.2, 550.1, 554.2, 555, 557, 572, 573, 455/571, 574, 90.3, 343.6; 418/557; 419/557; 420/557, 554.2, 555, 426.2
See application file for complete search history.

(56) References Cited

U.S. PATENT DOCUMENTS

| | | | |
|---|---|---|---|
| 5,548,824 A | 8/1996 | Inubushi et al. | |
| 5,555,448 A | 9/1996 | Thiede et al. | |
| 5,933,774 A | 8/1999 | Bertocci | |
| 6,073,031 A * | 6/2000 | Helstab et al. | 455/557 |
| 6,459,882 B1 * | 10/2002 | Palermo et al. | 455/41.1 |
| 6,628,966 B1 * | 9/2003 | Nagata | 455/557 |
| 6,636,749 B2 * | 10/2003 | Holmes et al. | 455/569.2 |
| 6,704,580 B1 | 3/2004 | Fintel | |
| 6,978,154 B1 | 12/2005 | Ospalak et al. | |
| 6,983,170 B2 | 1/2006 | Stulberger | |

(Continued)

FOREIGN PATENT DOCUMENTS

EP 0 863 648 9/1998

(Continued)

*Primary Examiner*—Rafael Perez-Gutierrez
*Assistant Examiner*—Olumide Ajibade-Akonai
(74) *Attorney, Agent, or Firm*—Duane Morris, LLP

(57) ABSTRACT

Methods and apparatus for implementing a wireless local loop phone that operates connected to or disconnected from a terminal unit. In one implementation, a phone system includes: a terminal unit comprising: a power source, a handset connection; a handset comprising: an antenna, a modem connected to the antenna, a terminal unit connection, a handset user interface; and a power connection cable connected to the handset connection and to the terminal unit connection; wherein the modem provides an air interface using the antenna, and the air interface provides a wireless local loop, when the handset is connected to the terminal unit through the handset connection and the terminal unit connection, the handset receives power from the power source through the power connection cable.

17 Claims, 5 Drawing Sheets

U.S. PATENT DOCUMENTS

| | | | |
|---|---|---|---|
| 7,117,007 B2* | 10/2006 | Yukie et al. | 455/550.1 |
| 2002/0086703 A1* | 7/2002 | Dimenstein et al. | 455/557 |
| 2002/0193145 A1 | 12/2002 | Latvakoski et al. | |
| 2003/0054859 A1 | 3/2003 | Goto | |
| 2003/0148788 A1* | 8/2003 | Kwak | 455/557 |
| 2004/0204074 A1* | 10/2004 | Desai | 455/557 |
| 2005/0037810 A1 | 2/2005 | Bryson | |

FOREIGN PATENT DOCUMENTS

| | | |
|---|---|---|
| EP | 0863648 | 10/2006 |
| WO | WO 95/09512 | 4/1995 |
| WO | WO 99/49682 | 9/1999 |
| WO | WO9949682 | 9/1999 |
| WO | WO 00/64200 | 10/2000 |
| WO | WO0064200 | 10/2000 |
| WO | WO 00/70780 | 11/2000 |
| WO | WO0070780 | 11/2000 |
| WO | WO9509512 | 11/2000 |

* cited by examiner

ENHANCED MOBILITY WIRELESS LOCAL LOOP PHONE

RELATED APPLICATION

This application is a continuation application of U.S. patent application Ser. No. 10/660,080, filed Sep. 10, 2003, now U.S. Pat. No. 7,117,007. This application claims the benefits of priority of U.S. Provisional Application No. 60/409,719, filed Sep. 10, 2002, and U.S. patent application Ser. No. 10/660,080, filed Sep. 10, 2003. The disclosures of the above-referenced patent applications are hereby incorporated by reference.

BACKGROUND

A wireless local loop phone is used to communicate with a wireless cellular or PCS network. Typically, a wireless local loop phone includes a handset connected to a terminal unit. The terminal unit provides an air interface to communicate with a wireless network, such as a CDMA, GSM, or TDMA network. Wireless local loop phones are often used as local and long distance home phones where a land line phone system is not available.

SUMMARY

The present invention provides methods and apparatus for implementing a wireless local loop phone that operates in one of two modes: (1) connected to or (2) disconnected from a terminal unit. In one implementation, a phone system includes: a terminal unit comprising: a power source, a handset connection; a handset comprising: an antenna, a modem connected to the antenna, a terminal unit connection, a handset user interface; and a power connection cable connected to the handset connection and to the terminal unit connection; wherein the modem provides an air interface using the antenna, and the air interface provides a wireless local loop, when the handset is connected to the terminal unit through the handset connection and the terminal unit connection, the handset receives power from the power source through the power connection cable.

In another implementation, a method of operating a wireless local loop phone includes: connecting a wireless local loop handset to a terminal unit using a power connection cable; providing power from the terminal unit to the handset through the power connection cable; operating the handset using the power from the terminal unit; disconnecting the handset from the terminal unit; and operating the handset using power in a battery within the handset; wherein operating the handset includes sending and receiving signals through a wireless local loop air interface, when the handset is connected to the terminal unit, the handset receiving power from the power from the terminal unit or the battery through the power connection cable.

DETAILED DESCRIPTION

Figure 1:
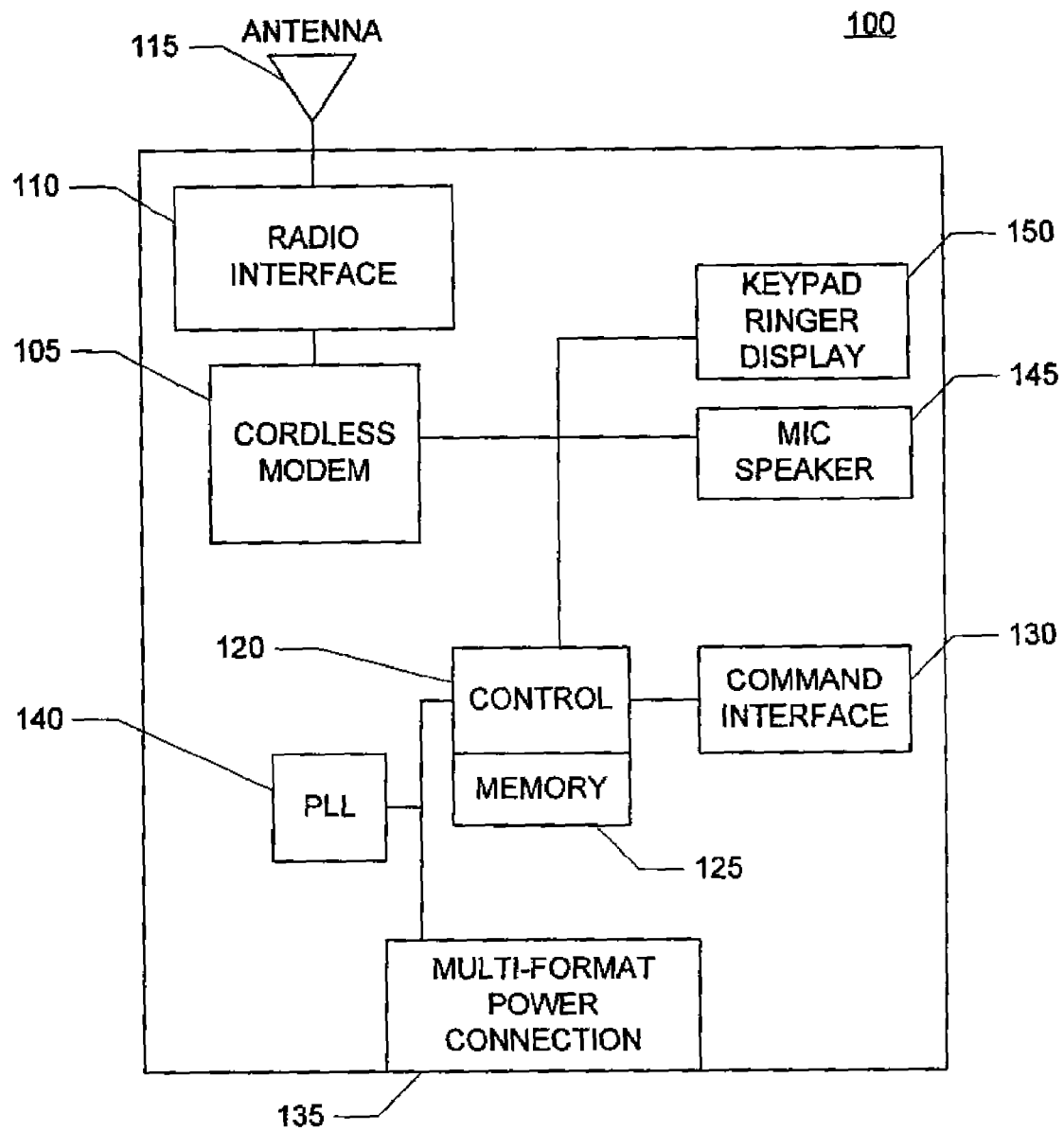
FIG. 1 shows a block diagram of one implementation of a wireless local loop phone handset including a multi-format power connection.

The present invention provides methods and apparatus for implementing a wireless local loop phone that operates connected to or disconnected from a terminal unit. In one implementation, a wireless local loop phone is a handset including an antenna and modem for communicating with a wireless network. The handset also includes a multi-format power connection. The multi-format power connection is compatible with a removable power connector (e.g., a cable) connected to a terminal unit. The multi-format power connection is also compatible with a removable battery. While the handset is connected to the terminal unit through the multi-format power connection, the handset receives power from the terminal unit and operates as a fixed wireless local loop phone. While the handset is connected to the removable battery through the multi-format power connection, the handset receives power from the battery and operates as a mobile wireless local loop phone.

In another implementation, a wireless local loop phone is again a handset including an antenna and modem. In this case, however, the handset includes a power connection for a removable power connector and a separate battery connection for a removable battery. The handset can be connected to both the power connector of the terminal unit and the removable battery at the same time. While the handset is connected to the terminal unit through the power connection, the handset receives power from the terminal unit and operates as a fixed wireless local loop phone. When the handset is disconnected from the terminal unit (e.g., by removing the power connector cable), and while the handset is connected to the removable battery, the handset receives power from the battery and operates as a mobile wireless local loop phone.

Two illustrative examples of implementations are described below. Additional variations are described after these examples.

In one example of one implementation, a wireless carrier or provider provides wireless local loop service for customers. The wireless carrier also provides or plans to provide mobile wireless service for customers. The wireless carrier builds and sells (or has a subcontractor build and sell) wireless local loop phones including multi-format power connections. For a customer using fixed wireless local loop service, the wireless carrier sells a wireless local loop phone connected to a terminal unit by a power connector cable. In this case, the power connector cable is not removable by the end consumer. For a customer using a mobile wireless service, the wireless carrier sells a wireless local loop phone with a battery connected to the multi-format power connection, without a terminal unit (though the carrier may provide a terminal unit or cradle as a recharging station). For both types of customers, the wireless local loop phone communicates with the same wireless network, such as a cellular or PCS network (e.g., CDMA, TDMA, or GSM).

When a customer wants to upgrade from fixed wireless local loop service to mobile wireless service, the customer brings the wireless local loop phone and connected terminal unit to the wireless carrier. The wireless carrier removes the power connector cable from the multi-format power connection and connects a battery in place of the cable.

In this example, a wireless carrier builds the same phone handset for two different types of services and customers. The wireless carrier provides a separate interchangeable component to specialize the phone handset for the target service. As a result, the wireless carrier achieves a desirable savings in manufacturing cost. In addition, the wireless carrier can avoid the need to replace consumer hardware when the user decides to change the type of service. The wireless carrier can then provide service changes at a lower cost.

In another example, in one implementation, a user has a wireless local loop phone handset connected to a terminal unit by a removable power connector cable. The handset also includes a battery. The terminal unit includes a power source (or a connection to an external power source) and a peripheral device connection. While the handset is connected to the terminal unit by the power cable, the handset draws power from the terminal unit, including recharging the battery. The handset and terminal unit operate together as a fixed wireless local loop phone. In addition, the handset can interact with a peripheral device connected to the peripheral connection of the terminal unit. When the handset is disconnected from the terminal unit, the handset draws power from the battery. The disconnected handset operates as a mobile wireless phone. When connected or disconnected, the handset communicates with the same wireless network.

In this example, the handset operates as either a fixed wireless local loop phone or as a mobile wireless phone. The user can select the mode of operation by connecting or disconnecting the handset with the terminal unit.

FIG. 1 shows a block diagram of one implementation of a wireless local loop phone handset 100 including a multi-format power connection. The handset 100 includes a wireless local loop (WLL) modem 105. The wireless local loop modem 105 is a wireless telephony modem and supports a wireless phone connection and protocol or air interface for communication with a wireless network, such as a cellular, PCS, or fixed wireless connection (e.g., such as CDMA, TDMA, or GSM among others). In one implementation, the wireless network is a dedicated wireless local loop network. In another implementation, the wireless network is a cellular or PCS network also used for wireless mobile handsets (e.g., cell phones). In one implementation, the wireless network is connected to the public switched telephone network (PSTN). In another implementation, the wireless network is connected to a different telephone network such as a private exchange or private cellular network.

In an alternative implementation, the handset includes a local wireless modem. The local wireless modem supports a wireless phone connection and protocol or air interface for local or short-range communication with a wireless device or handset, such as a typical analog cordless connection, a digital cordless connection, or a wireless LAN connection (e.g., 802.11 or "Wi-Fi").

The wireless local loop modem 105 is connected to a radio interface 110 which is in turn connected to an antenna 115. In one implementation, the radio interface 110 is a typical radio interface and includes: radio frequency (RF) components, a duplexer, a low noise amplifier (LNA), a bandpass filter (BPF), an isolator, and a power amplifier. The radio interface 110 operates similarly to typical radio interfaces in mobile wireless handsets. For sending signals using the wireless local loop connection, the wireless local loop modem 105 provides modulated signals to the radio interface 110 and on to the antenna 115. For receiving signals using the wireless local loop connection, the antenna 115 provides a signal received from the wireless network to the radio interface 110 and on to the wireless local loop modem 105.

The handset 100 includes a control block 120 and connected memory 125 to support and control the operation of the handset 100. The control block 120 and the modem 105 operate together to place and receive telephone calls through the wireless network. A command interface 130 is connected to the control block 120. The command interface 130 processes commands received by the handset 100. In one implementation, the handset also exchanges commands with the terminal unit. The control block 120 and the command interface 130 operate in conjunction to carry out the received commands.

The handset 100 includes a multi-format power connection 135. The multi-format power connection 135 receives power from a connected power source and provides power to the components of the handset 100 (power connections are not shown in FIG. 1). In one implementation, the handset 100 receives power through the multi-format power connection 135 only. The multi-format power connection 135 is compatible with multiple types of power sources. In one implementation, the multi-format power connection 135 is compatible with a removable power connector cable for connecting the handset 100 to a terminal unit and is compatible with a removable battery. In this case, the multi-format power connection 135 is configured to accept either the power connector cable or the battery at one time. In another implementation, the multi-format power connection is compatible with various power sources that share a common interface. In an alternative implementation, the handset also sends and receives data through the multi-format power connection.

The handset 100 also includes additional components typical of a wireless phone handset: a phase locked loop (PLL) 140; an audio block 145 including a microphone and a speaker; and a user interface 150 including a keypad (e.g., for number entry), ringer, and display.

In operation, the handset 100 places and receives calls through the wireless network as a wireless local loop phone or wireless mobile phone depending on the connection or disconnection to the terminal unit. For example, the handset provides basic wireless local loop phone functions such as a simulated dial tone function and an auto pulse sending function.

Figure 2:
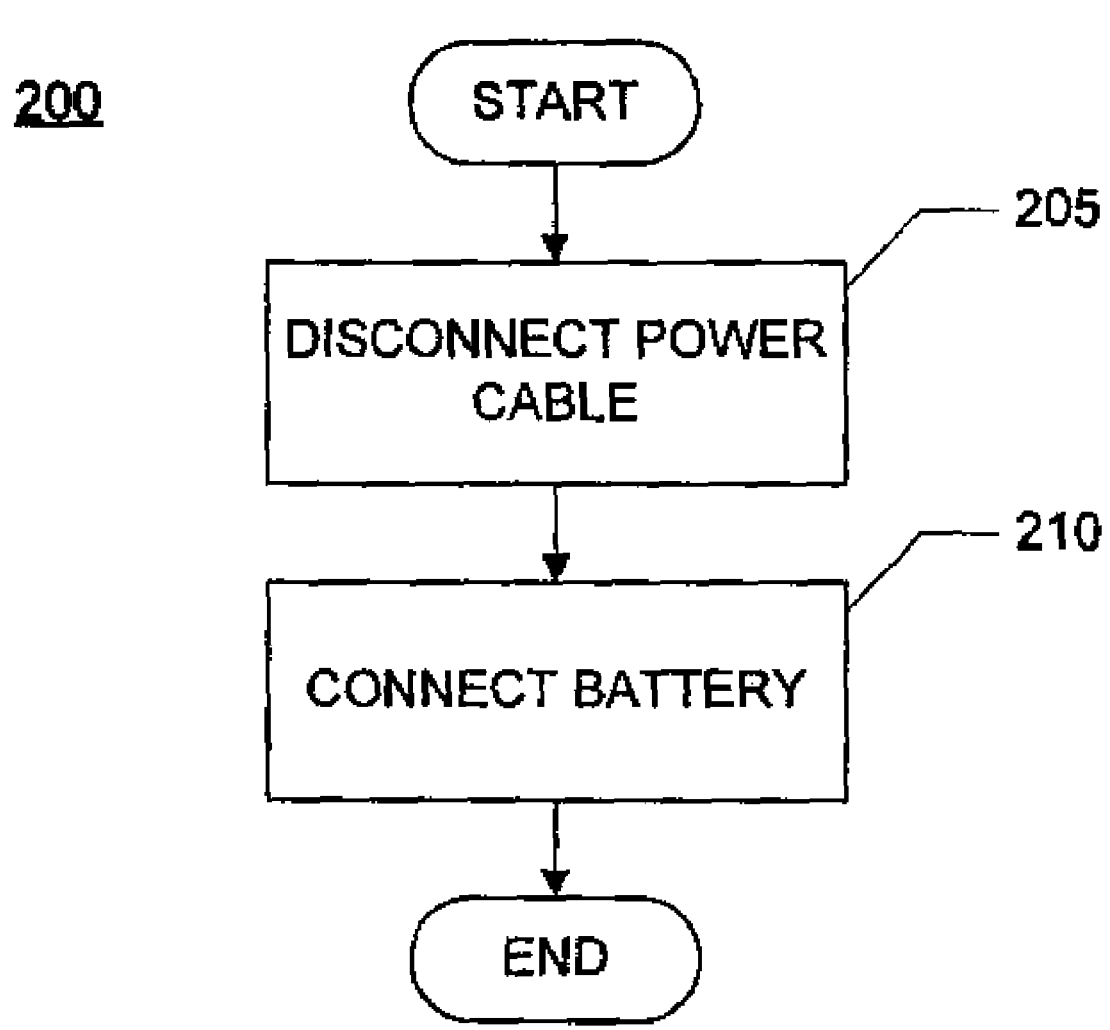
FIG. 2 shows a flow chart of one implementation of upgrading a fixed wireless local loop phone to a mobile wireless phone.

FIG. 2 shows a flow chart 200 of one implementation of upgrading a fixed wireless local loop phone to a mobile wireless phone. Initially, a wireless local loop phone handset including a multi-format power connection is connected to a terminal unit by a power connector cable. The power connector cable is not ordinarily removable by the user. The user has brought the handset and terminal unit to a wireless carrier service center and requested an upgrade in service from fixed wireless local loop service to mobile wireless service.

The service center disconnects the power connector cable from the multi-format power connection of the handset, block 205. In one implementation, the multi-format power connection is inside the casing of the handset such that a proprietary tool is needed to access the multi-format power connection and disconnect the power connector cable. The service center connects a rechargeable battery to the multi-format power connection of the handset, block 210. In one implementation, after connecting the battery, the service center closes the casing of the handset such that the user will not ordinarily be able to open the casing to access the multi-format power connection.

In one implementation, the service center provides a different casing for the handset (or part of the handset) to provide a connection for recharging the battery. In this case, the terminal unit includes a cradle for receiving the handset to recharge the battery. Alternatively, a separate recharging cradle or cable can be used.

Figure 3:
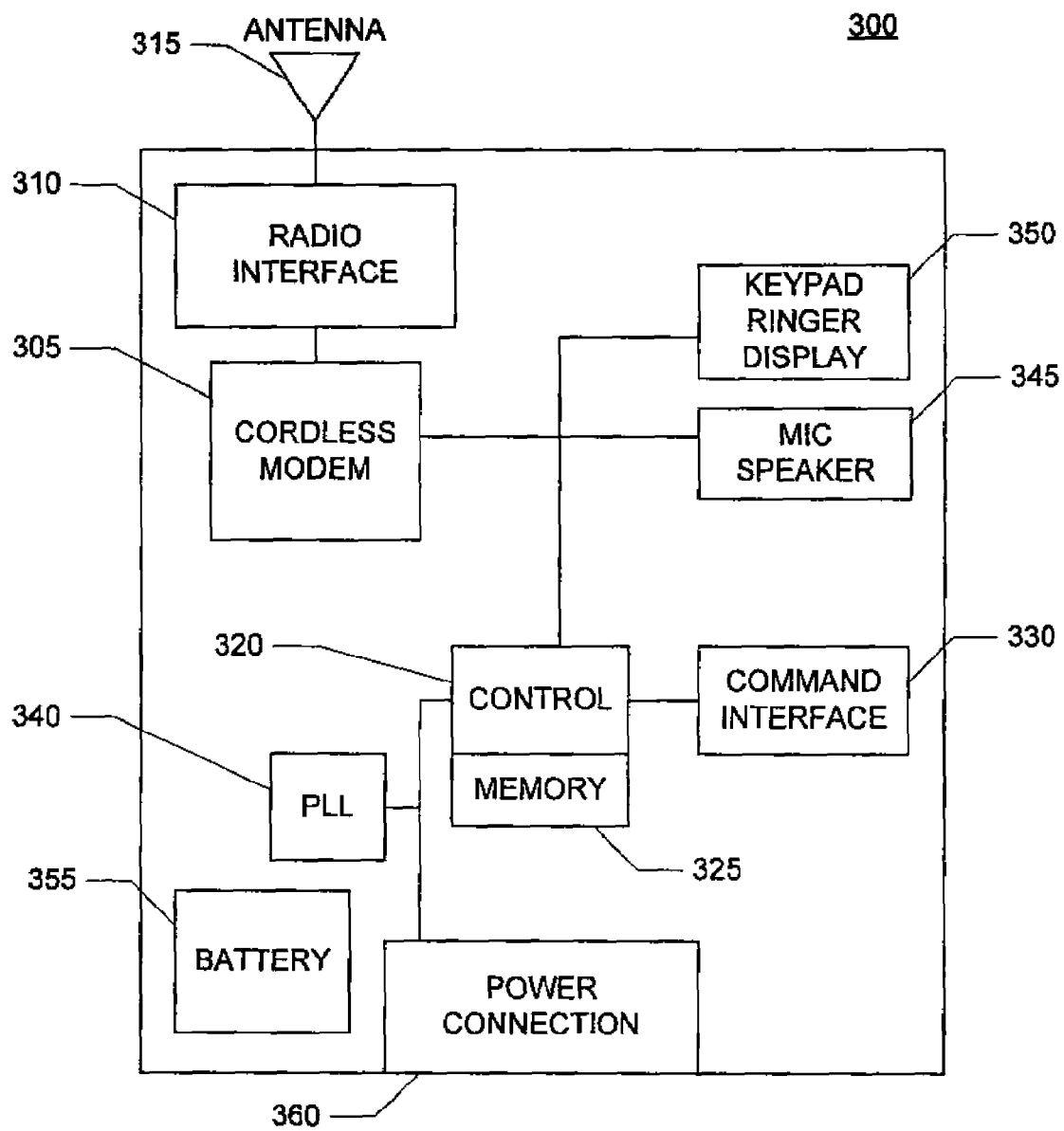
FIG. 3 shows a block diagram of one implementation of a wireless local loop phone handset including a battery and a power connection.

FIG. 3 shows a block diagram of one implementation of a wireless local loop phone handset 300 including a battery and a power connection. The handset 300 is similar to the handset 100 shown in FIG. 1. Accordingly, similar components in FIG. 3 are numbered and operate similarly to those components described above for FIG. 1.

The handset 300 does not include a multi-format power connection. Instead, the handset 300 includes a battery 355 and a power connection 360. While the handset 300 is connected to a terminal unit through a power connector cable connected to the power connection 360, the handset draws power from the power connection 360. While the handset 300 is disconnected from the terminal unit, the handset draws power from the battery 355.

Figure 4:
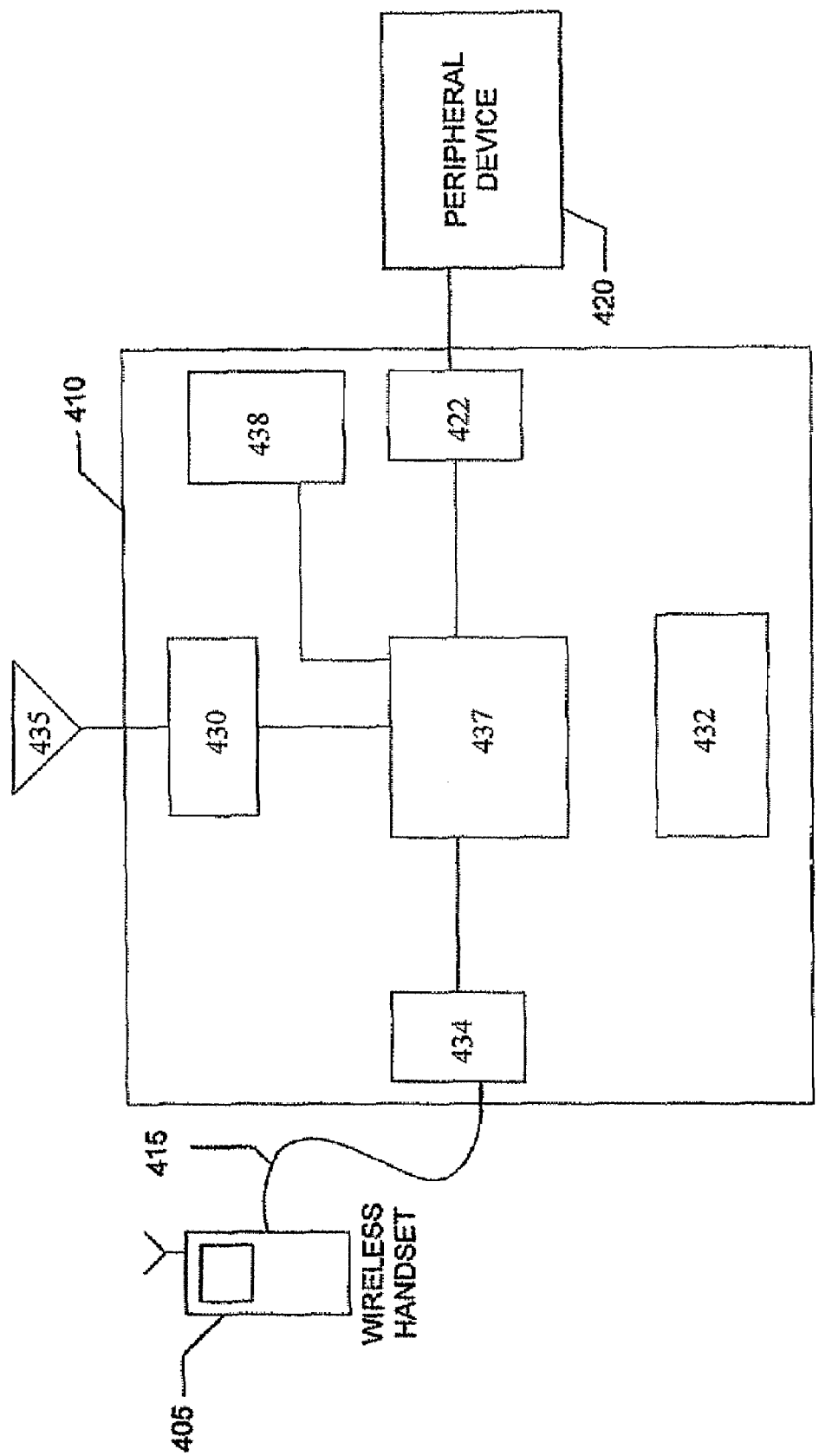
FIG. 4 shows a block diagram of one implementation of a wireless local loop phone handset and a terminal unit.

FIG. 4 shows a block diagram of one implementation of a wireless local loop phone handset 405 and a terminal unit 410. The handset 405 is connected to the terminal unit 410 by a power cable 415. As described above, while the handset 405 is connected to the terminal unit 410, the handset draws power from the terminal unit 410 through the power cable 415. If the handset 405 is disconnected from the terminal unit 410 by removing the power cable 415, the handset 405 draws power from an internal battery (e.g., the battery 350 shown in FIG. 3).

A peripheral device 420 is connected to the terminal unit 410 through a peripheral device connection 422 of the terminal unit 410. Tn one implementation, the peripheral device connection 422 of the terminal unit 410 is an RI-11 connection or an RS-232 or RJ-45 connection. In another implementation, the peripheral connection is a local wireless connection, such as IrDA, Wi-Fi, or Bluetooth. A compatible peripheral device 420 exchanges data with the terminal unit 410 through the peripheral device connection. For example, the peripheral device 420 can be an analog fax machine for an RJ-1 I connection, or a computer system for an RJ-45 connection. In one implementation, the peripheral device 420 and handset 405 can also exchange voice data and signals. The terminal unit 410 passes data from the peripheral device 420 to the handset 405 through the power cable 415. Similarly, the handset 405 sends data to the peripheral device 420 through the power cable 415 and the terminal unit 410. In an alternative implementation, the handset 405 and the peripheral device 420 do not exchange data. The terminal unit 410 includes a terminal command interface 437 for processing commands received from the handset 405. The terminal command interface 437 also processes commands received through h the terminal user interface 438. Similar to the handset user interface 150 and 350 of FIGS. 1 and 3, the terminal user interface 438 is an interface device appropriate to receive user commands. The terminal unit 410 also includes a power source In an alternative implementation, the terminal unit 410 includes a power source 432, a wireless modem 430 and an antenna 435 as well. In this case, when the handset is connected to the terminal unit by the power cable, the handset uses the modem 430 and antenna 435 of the terminal unit to interact with the wireless network. The handset sends and receives voice data and other signals to the terminal unit through the power cable. When the handset is disconnected from the terminal unit, the handset uses the modem and antenna of the handset to communicate with the wireless network.

Figure 5:
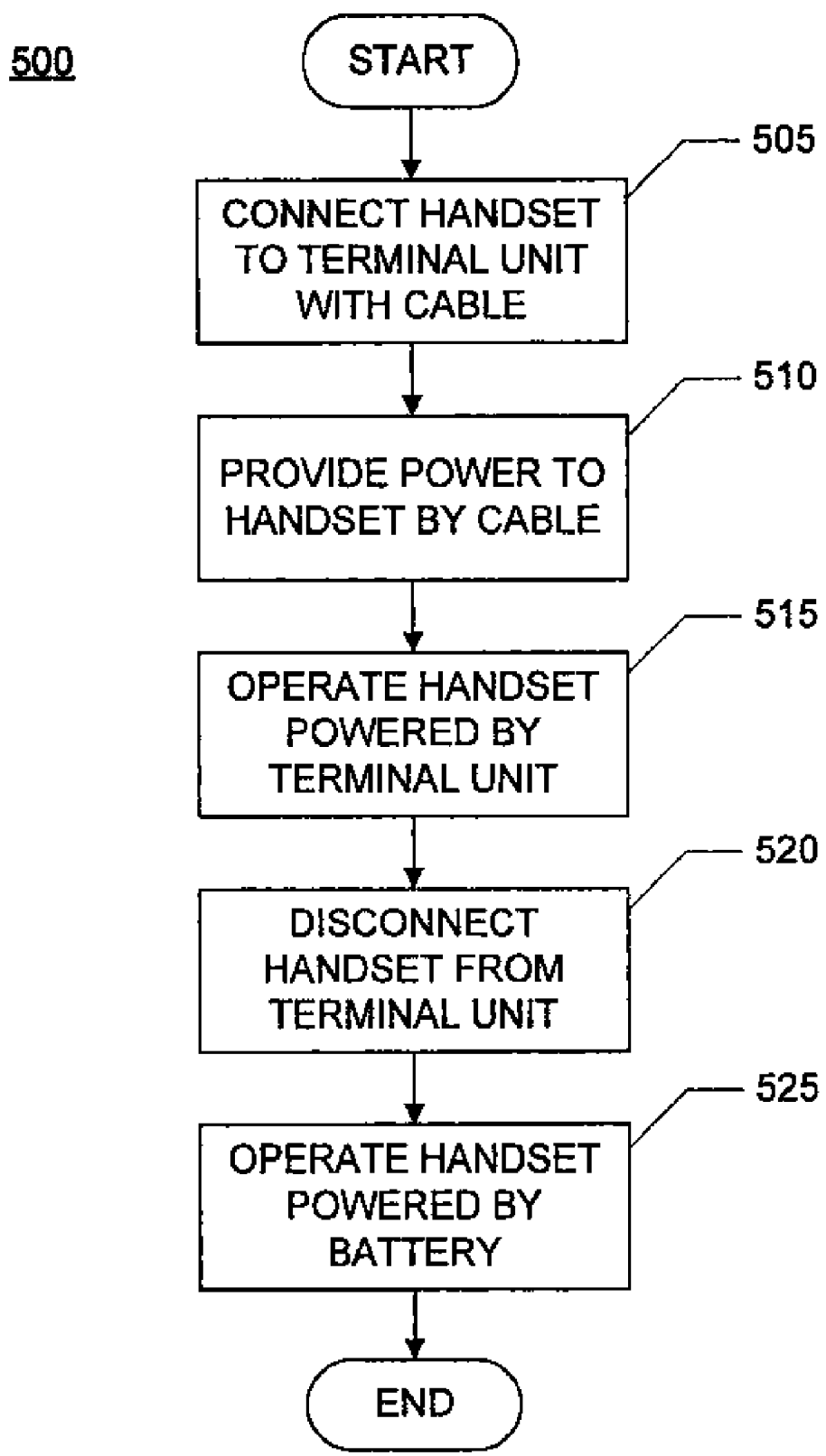
FIG. 5 shows a flow chart of one implementation of connecting and disconnecting a wireless local loop handset with a terminal unit.

FIG. 5 shows a flow chart 500 of one implementation of connecting and disconnecting a wireless local loop handset with a terminal unit. Initially, a wireless local loop handset includes a wireless local loop modem and antenna, and a battery and a power connection, such as the handset 300 shown in FIG. 3. The terminal unit includes a handset connection 434 for a power cable to connect to the handset.

A user connects the handset to a terminal unit, block 505. The user connects the handset to the terminal unit using a power cable. The terminal unit provides power to the handset through the power cable, block 510, and the handset operates using the power from the terminal unit, block 515. The handset operates by sending and receiving signals using the antenna and modem of the handset to communicate with a wireless network, such as for placing and receiving phone calls.

The user disconnects the handset from the terminal unit, block 520. The user disconnects the handset by disconnecting the power cable from the power connection of the handset. The user operates the handset using power from the internal battery of the handset, block 525.

In this way, a user can continue to operate the handset using either the power source of the terminal unit or the battery of the handset.

The various implementations of the invention are realized in electronic hardware, computer software, or combinations of these technologies. Some implementations include one or more computer programs executed by a programmable processor or computer. For example, referring to FIGS. 1 and 3, in one implementation, the handset includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using a wireless local loop connection, other connections can also be used, such as a wireless LAN connection. In another alternative implementation, either or both of the terminal unit and the handset are not a standalone units, but instead are components of other systems, such as integrated into a computer system (e.g., a laptop).

Accordingly, the present invention is not limited to only those implementations described above.

What is claimed is:

1. A phone system for use by an end user, comprising:
   a terminal unit comprising:
   a power source,
   a handset connection;

a handset comprising:
   an antenna,
   a modem connected to said antenna,
   a power connection for connecting to a terminal unit,
   a handset user interface; and
   a power connection cable connected to said handset connection and to said power connection, wherein said power connection cable is not removable by said end user;
   wherein said modem provides an air interface using said antenna, and said air interface provides a wireless local loop, when said handset is connected to said terminal unit through said power connection cable, said handset receives power from said power source through said power connection cable.

2. The phone system of claim 1, wherein said handset further comprises
   a battery, and when said handset is not connected to said terminal unit ,said handset uses said battery for power.

3. The phone system of claim 2, wherein said battery receives power for recharging from said power source.

4. The phone system of claim 1, wherein said air interface provides a cellular phone air interface.

5. The phone system of claim 1, wherein said air interface provides a PCS air interface.

6. The phone system of claim 1, wherein said handset farther comprises a handset command interface for processing commands received through said handset user interface.

7. The phone system of claim 6, wherein said handset command interface processes commands received from said terminal unit.

8. The phone system of claim 1, wherein said terminal unit further comprises a peripheral connection for connecting a peripheral device to said terminal unit.

9. The phone system of claim 8, wherein said peripheral connection is an RJ-11 connection.

10. The phone system of claim 8, wherein said peripheral connection supports connecting a fax machine to said terminal unit.

11. The phone system of claim 8, wherein when said handset is connected to said terminal unit ,said handset receives data from said peripheral connection.

12. The phone system of claim 8, wherein when said handset is connected to said terminal unit ,said handset sends data to said peripheral connection.

13. The phone system of claim 1, wherein said terminal unit further comprises a terminal command interface for processing commands received from said handset.

14. The phone system of claim 1, wherein said terminal unit further comprises a terminal user interface.

15. The phone system of claim 14, wherein said terminal unit further comprises
   a terminal command interface for processing commands received through said terminal user interface.

16. The phone system of claim 15, wherein said terminal command interface processes commands received from said handset.

17. A method of operating a wireless local loop phone for use by an end user, the method comprising:
   connecting a wireless local loop handset to a terminal unit using a power connection cable;
   providing power from said terminal unit to said handset through said power connection cable;
   operating said handset using said power from said terminal unit;
   disconnecting said handset from said terminal unit; and
   operating said handset using power in a battery within said handset;
   wherein said power connection cable is not removable by said end user, and
   wherein operating said handset includes sending and receiving signals through a wireless local loop air interface, when said handset is connected to said terminal unit, said handset receiving power from said power from said terminal unit or said battery through said power connection cable.

* * * * *